US011898975B2

(12) United States Patent
Takahashi et al.

(10) Patent No.: US 11,898,975 B2
(45) Date of Patent: Feb. 13, 2024

(54) ELECTRON SPECTROMETER

(71) Applicant: TOHOKU UNIVERSITY, Sendai (JP)

(72) Inventors: Masahiko Takahashi, Sendai (JP); Isao Nakajima, Sendai (JP); Yuuki Onitsuka, Sendai (JP)

(73) Assignee: TOHOKU UNIVERSITY, Sendai (JP)

( * ) Notice: Subject to any disclaimer, the term of this patent is extended or adjusted under 35 U.S.C. 154(b) by 82 days.

(21) Appl. No.: 17/652,237

(22) Filed: Feb. 23, 2022

(65) Prior Publication Data
US 2022/0373485 A1 Nov. 24, 2022

(30) Foreign Application Priority Data

May 18, 2021 (JP) ................................. 2021-083908

(51) Int. Cl.
G01N 23/2251 (2018.01)
(52) U.S. Cl.
CPC ..... *G01N 23/2251* (2013.01); *G01N 2223/07* (2013.01); *G01N 2223/30* (2013.01); *G01N 2223/507* (2013.01)
(58) Field of Classification Search
CPC ........... G01N 23/2251; G01N 2223/07; G01N 2223/30; G01N 2223/507; H01J 49/48; H01J 37/00; H01J 37/02; H01J 37/26; H01J 37/28; H01J 37/252; H01J 3/34
USPC ................. 250/305, 306, 307, 311
See application file for complete search history.

(56) References Cited

U.S. PATENT DOCUMENTS

| | | | | |
|---|---|---|---|---|
| 2009/0314934 | A1* | 12/2009 | Brown | H01J 49/408 250/281 |
| 2013/0126727 | A1* | 5/2013 | Jozwiak | G01N 23/227 250/305 |
| 2015/0357175 | A1* | 12/2015 | Hoang | H01J 49/20 250/288 |

OTHER PUBLICATIONS

Onitsuka, et al., "Poster: Dvelopment of a multi-turn time-of-flight electron analyzer toward molecular orbital imaging at ultra-high resolution", The 4th Symposium for The Core Research Cluster for Materials Science and the 3rd Symposium on International Joint Graduate Program in Materials Science, Tohoku University, (Nov. 2020), 17 pgs.

Onitsuka, et al., "Proceedings: Development of a multi-turn time-of-flight electron analyzer toward molecular orbital imaging at ultra-high resolution, P-25", The 4th Symposium for The Core Research Cluster for Materials Science and the 3rd Symposium on International Joint Graduate Program in Materials Science, Tohoku University, (Nov. 2020), 17 pgs.

(Continued)

*Primary Examiner* — Jason L McCormack
(74) *Attorney, Agent, or Firm* — Schwegman Lundberg & Woessner, P.A.

(57) ABSTRACT

The electron spectrometer includes an excitation part 100 irradiating a sample with an energy beam, an orbiting part 10 causing electrons emitted from the sample irradiated with the energy beam to orbit, and a detection part 120 detecting the electrons released from the orbiting part 10, in which the orbiting part 10 includes a plurality of pairs of electrodes, the plurality of pairs of electrodes cause the electrons to orbit when an applied voltage is controlled, a part of the plurality of pairs of electrodes are pairs of electrodes to catch which catch the electrons into the orbiting part 10 when an applied voltage is controlled, and a part of the plurality of pairs of electrodes are pairs of electrodes to release which release the (Continued)

electrons from the orbiting part 10 when an applied voltage is controlled.

11 Claims, 10 Drawing Sheets

(56) References Cited

OTHER PUBLICATIONS

Pérez-Dieste, V., et al., "Near ambient pressure XPS at ALBA", Journal of Physics: Conference Series. vol. 425. No. 7. IOP Publishing, (2013), 5 pgs.

Takahashi, "Proceedings: Molecular science desired to be cut off by an ultrahigh resolution and ultrahigh sensitivity electron momentum spectrometer", IQCE Quantity Search lecture 2020 "Chemistry for quantification", (Sep. 30, 2020), 4 pgs.

Takahashi, "Slide: Molecular science desired to be cut off by an ultrahigh resolution and ultrahigh sensitivity electron momentum spectrometer", IQCE Quantity Search lecture 2020, (Nov. 2, 2020), 40 pgs.

\* cited by examiner

ELECTRON SPECTROMETER

CLAIM FOR PRIORITY

Priority is claimed on Japanese Patent Application No. 2021-83908, filed on May 18, 2021, the content of which is incorporated herein by reference.

BACKGROUND OF THE INVENTION

Field of the Invention

The present invention relates to an electron spectrometer.

Description of Related Art

As a measurement method for obtaining information on energy levels of electrons in a substance, there is electron spectroscopy. Through electron spectroscopy, information on energy of electrons in a substance can be obtained by irradiating the substance with an energy beam such as light and electrons and measuring an energy distribution of free electrons emitted from the substance.

As an electron spectrometer using electron spectroscopy, for example, there is a time-of-flight electron spectrometer. A time-of-flight electron spectrometer measures a time taken for ejected electrons to reach a detection part, calculates a velocity from the measured time, and analyzes energy thereof. However, since electrons have a light mass, a velocity thereof is high. Therefore, there is a problem that the time-of-flight electron spectrometer, whose resolution depends on a distance until the ejected electrons reach the detection part, can be applied only to low-velocity electrons (less than 10 eV).

As another electron spectrometer, there is a velocity map imaging (VMI) type electron spectrometer. A VMI type electron spectrometer analyzes kinetic energy of electrons by mapping all electrons having the same initial velocity vector to the same point on a two-dimensional detector using an electrostatic ion lens regardless of positions of generation in an ionization region. However, the VMI type electron spectrometer has a problem that, although it can be applied to low-velocity electrons and medium-velocity electrons (10 to 300 eV), it cannot be applied to high-velocity electrons (more than 300 eV).

Non-Patent Document 1 discloses an electrostatic electron spectrometer. An electrostatic electron spectrometer changes a flight trajectory of electrons by an electric field and measures energy of the electrons from a relationship between an electric field strength and an amount of deflection. The electrostatic electron spectrometer can be applied to electrons of low-velocity to high-velocity.

NON-PATENT DOCUMENTS

[Non-Patent Document 1] V. Perez-Dieste et al., J. Physics: Conf. Series 425, 072023 (2013)

SUMMARY OF THE INVENTION

Research on electron momentum spectroscopy is underway to directly observe electron motion in a substance. Electron momentum spectroscopy is an experimental method that utilizes Compton scattering with high-velocity electrons as an excitation source, and a shape of a wave function of each molecular orbital can be observed in a momentum space. Compton scattering allows electrons having high energy on the order of keV to be detected. The electrostatic electron spectrometer described in Non-Patent Document 1 cannot obtain sufficient resolution for electrons on the order of keV (for example, when electron energy is 600 eV, a resolution thereof is 2 eV). Therefore, there is a demand for an electron spectrometer having higher resolution for high-velocity electrons than the electrostatic electron spectrometer.

The present invention has been made in view of the above-described circumstances, and an objective of the present invention is to provide an electron spectrometer capable of detecting electrons of low velocity to high velocity with high resolution.

The gist of the present disclosure is as follows.

(1) An electron spectrometer according to one aspect of the present invention includes an excitation part irradiating a sample with an energy beam, an orbiting part causing electrons emitted from the sample irradiated with the energy beam to orbit, and a detection part detecting the electrons released from the orbiting part, in which the orbiting part includes a plurality of pairs of electrodes, the plurality of pairs of electrodes cause the electrons to orbit when an applied voltage is controlled, a part of the plurality of pairs of electrodes are pairs of electrodes to catch which catch the electrons into the orbiting part when an applied voltage is controlled, and a part of the plurality of pairs of electrodes are pairs of electrodes to release which release the electrons from the orbiting part when an applied voltage is controlled.

(2) The electron spectrometer according to the above-described (1) may further include a bunch compression part which reduces a time spread of an electron bunch, which is a bunch of electrons, by changing at least one of the velocity and the trajectory of the electrons.

(3) In the electron spectroscope according to the above-described (2), the bunch compression part may include an electron velocity modulation part disposed adjacent to the pair of electrodes to catch side, and the electron velocity modulation part may change a velocity of the electrons and then send the electrons to the pair of electrodes to catch side.

(4) In the electron spectrometer according to the above-described (3), the electron velocity modulation part may be an electrostatic lens.

(5) In the electron spectrometer according to any one of the above-described (2) to (4), the bunch compression part may include a first trajectory correction part which changes a trajectory of the electrons disposed on the pair of electrode to catch and a second trajectory correction part which changes the trajectory of the electrons disposed on the pair of r electrodes to release side, and the bunch compression part may reduce a time spread of the electron bunch using the first trajectory correction part and the second trajectory correction part.

(6) In the electron spectrometer according to the above-described (5), the first trajectory correction part and the second trajectory correction part may be electrostatic lenses.

(7) In the electron spectrometer according to any one of the above-described (1) to (6), the plurality of pairs of electrodes may form an outer electrode and an inner electrode, an inner circumferential surface of the outer electrode and an outer circumferential surface of the inner electrode may have a spherical shape, and a space between the inner circumferential surface of the outer electrode and the outer circumferential surface of the inner electrode may serve as an orbiting path of the electrons.

(8) In the electron spectrometer according to any one of the above-described (1) to (6), the plurality of pairs of electrodes may form an outer electrode and an inner electrode, an inner circumferential surface of the outer electrode and an outer circumferential surface of the inner electrode may have a cylindrical shape, and a space between the inner circumferential surface of the outer electrode and the outer circumferential surface of the inner electrode may serve as an orbiting path of the electrons.

According to the above-described aspect of the present invention, an electron spectrometer capable of detecting electrons of low velocity to high velocity with high resolution can be provided.

DETAILED DESCRIPTION OF THE INVENTION

Hereinafter, an electron spectrometer according to one embodiment of the present invention will be described with reference to FIGS. 1 and 2. In the following description, components having the same or similar functions are denoted by the same reference signs. Components having the same or similar functions may not be described repeatedly. Also, "parallel," "perpendicular," "the same," and "equivalent" described in the present specification include cases of "substantially parallel," "substantially perpendicular," "substantially the same," and "substantially equivalent." The term "connection" described in the present specification is not limited to a case in which two members are in direct contact with each other and includes a case in which another member is interposed between the two members.

First Embodiment

Figure 1:
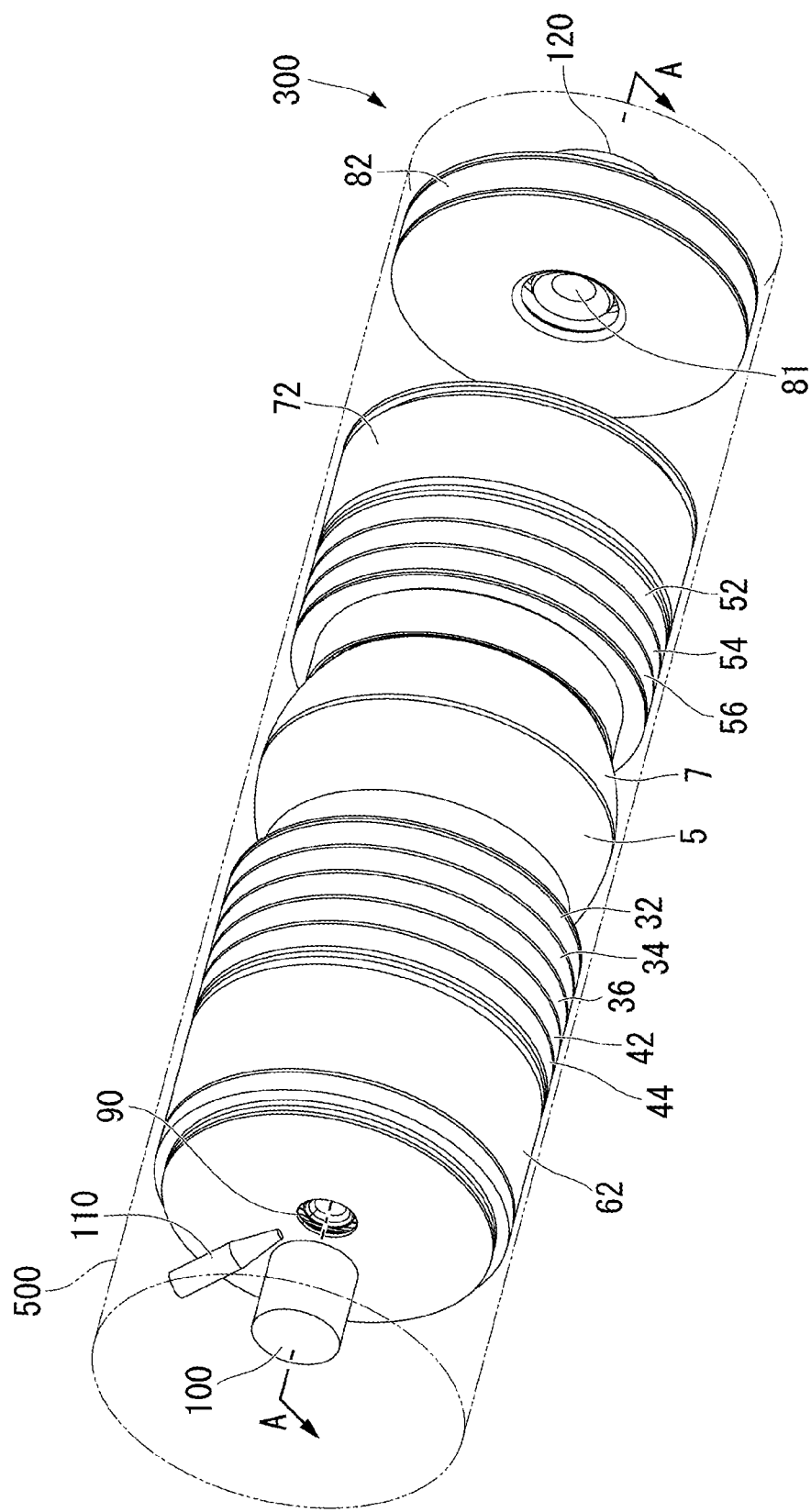
FIG. 1 is a schematic perspective view of an electron spectrometer according to one embodiment of the present invention.

FIG. 1 is a schematic perspective view of an electron spectrometer 300 according to a first embodiment. FIG. 2 is a cross-sectional view along line A-A of the electron spectrometer 300 illustrated in FIG. 1. The electron spectrometer 300 includes an orbiting part 10, a bunch compression part 20, a first deflection part 60, a second deflection part 70, a third deflection part 80, a port to catch 90, an excitation part 100, a sample delivery part 110, and a detection part 120, and a control unit (not illustrated). The parts described above are connected so that a vacuum state through an electron path can be maintained. In the first embodiment, the orbiting part 10, the bunch compression part 20, the first deflection part 60, the second deflection part 70, the third deflection part 80, the port to catch 90, the excitation part 100, the sample delivery part 110, and the detection part 120 are housed inside a container 500.

Since electrons emitted from a sample have a time width of an energy beam (for example, an electron beam or X-rays), the electrons are emitted from the sample as a bunch of electrons (electron bunch) having a certain time width (time spread). Also, an ionization region of the sample has a predetermined size. Here, "ionization region" refers to a spatial region in which electrons are emitted from the sample. Therefore, electrons are emitted as an electron bunch having a certain time width (time spread) also due to a difference in positions of emission from the sample. The bunch compression part 20 has a function of reducing (compressing) a time spread of the electron bunch, which is a bunch of electrons, by changing at least one of a velocity and a trajectory of the electrons emitted from the sample. The bunch compression part 20 includes an electron velocity modulation part 30, a first trajectory correction part 40, and a second trajectory correction part 50. Hereinafter, each of the parts will be described.

(Excitation Part)

The excitation part 100 has a function of irradiating the sample with an energy beam. The energy beam exciting the sample is not particularly limited. The energy beam may be, for example, an electron beam, a laser beam, or the like. The excitation part 100 may be, for example, an electron gun, a laser, or the like. Electrons emitted from the sample irradiated with the energy beam include scattered electrons in which an electron beam serving as the energy beam is scattered and ionized electrons ionized from the sample.

(Sample Delivery Part)

The sample delivery part 110 sends a sample to an irradiation region E in which the energy beam is irradiated. The sample delivery part 110 is, for example, a gas nozzle. A state of the sample is not particularly limited as long as electrons are emitted from the sample by being irradiated with an energy beam. The sample may be in any of a solid state, a liquid state, or a gas state. Also, the sample may be in an unstable state in terms of energy.

(PTake-In Port to Catch)

Electrons emitted from a sample irradiated with the energy beam pass through the port to catch 90 and enter the first deflection part 60. An angle X (scattering angle when the energy beam is an electron beam) formed by a traveling direction F of the energy beam (here, an electron beam) and a direction connecting the center of the region E in which the sample is irradiated with the energy beam and the take-in port to catch 90 is not particularly limited, and may be, for example, 45 degrees. In the case of 45 degrees, electrons with a scattering angle of 45 degrees enter the orbiting part 10. The portto catch90 of the first embodiment has a shape in which a hole forming the angle X with respect to the traveling direction F of the energy beam is rotated 360 degrees with the traveling direction F of the energy beam as a central axis. When the port to catch 90 has such a shape, electrons having different azimuthal angles φ can be caught.

(First Deflection Part)

The first deflection part 60 deflects the trajectory of electrons that have passed through the port to catch 90 to enter the first trajectory correction part 40. The first deflection part 60 is constituted by, for example, electrodes 61 and 62. The shapes of the electrodes 61 and 62 are not particularly limited as long as the trajectory of electrons can be deflected so that the electrons enter the first trajectory correction part 40.

(First Trajectory Correction Part)

The first trajectory correction part 40 changes the trajectory of electrons so that a time to reach the detection part 120 converges for each electron energy. The first trajectory correction part 40 is disposed on a pair of electrodes to catch side. Also, when the first trajectory correction part 40 and the second trajectory correction part 50 invert an isochronous plane of an emitted electron bunch (a plane connecting electrons emitted at the same time), the isochronous plane of the electrons can be made parallel to a surface of the detection part 120 when the electrons reach the detection part 120. Thereby, a time spread of the electron bunch can be reduced.

The first trajectory correction part 40 is, for example, an electrostatic lens. In the first embodiment, the first trajectory correction part 40 is constituted by electrodes 35, 36, 41, 42, 43, and 44. In the first embodiment, the electrodes 35, 36, 41, 42, 43, and 44 are ring-shaped electrodes. The electrode 35 is disposed inside the electrode 36. The electrode 35 and the electrode 36 form an external electrode of the first trajectory correction part 40. The electrode 41 is disposed inside the electrode 42. The electrodes 41 and 42 form a center electrode of the first trajectory correction part 40. The electrode 43 is disposed inside the electrode 44. The electrode 43 and the electrode 44 form an external electrode of the first trajectory correction part 40. In the present embodiment, the two external electrodes of the first trajectory correction part 40 are, for example, the ground. A steady voltage is applied to the center electrode of the first trajectory correction part 40. The first trajectory correction part 40 converges electrons that have entered the first trajectory correction part 40 through the first deflection part 60.

(Electron Velocity Modulation Part)

The electron velocity modulation part 30 has a function of changing a velocity of electrons emitted from the sample. In the first embodiment, the electron velocity modulation part 30 is disposed adjacent to a pair of electrodes to catch (electrodes to catch 1 and 5) side of the orbiting part 10. The electron velocity modulation part 30 sends electrons to the pair of electrodes to catch side after changing the velocity of the electrons. The electron velocity modulation part 30 accelerates a front portion (a side that reaches the orbiting part 10 sooner) of the electron bunch and decelerates a rear portion (a side that reaches the orbiting part 10 later) of the electron bunch. As the velocity of the electrons becomes faster, a time required for orbiting becomes longer. Therefore, when the electron bunch is caused to orbit in the orbiting part 10 after the front portion of the electron bunch is accelerated and the rear portion thereof is decelerated, a time spread of the electron bunch can be reduced.

The electron velocity modulation part 30 is, for example, an electrostatic lens. In the first embodiment, the electron velocity modulation part 30 is an electrostatic lens including electrodes 31, 32, 33, 34, 35, and 36.

In the first embodiment, the electrodes 31, 32, 33, 34, 35, and 36 are ring-shaped electrodes. The electrode 31 is disposed inside the electrode 32. The electrode 31 and the electrode 32 form an external electrode of the electron velocity modulation part 30. The electrode 33 is disposed inside the electrode 34. The electrodes 33 and 34 form a center electrode of the electron velocity modulation part 30. The electrode 35 is disposed inside the electrode 36. The electrodes 35 and 36 form an external electrode of the electron velocity modulation part 30. In the present embodiment, the two external electrodes are, for example, the ground, and when a voltage in a sine-wave form is applied to the center electrode, the electron bunch can be compressed after orbiting. Further, the electrostatic lens is constituted by two external electrodes and one center electrode. In the present embodiment, three external electrodes and two center electrodes form two electrostatic lenses. That is, the electron velocity modulation part 30 and the first trajectory correction part 40 share one external electrode.

(Orbiting Part)

The orbiting part 10 has a function of causing electrons to orbit. Electrons to be subjected to orbiting are the electrons emitted from the sample irradiated with the energy beam. When an electric field is applied to cause the electrons to orbit in the orbiting part 10, a flight distance of the electrons can be made large. As a result, a resolution of the electron spectrometer 300 can be improved. When the number of times the electrons orbit is increased, a resolution of the electron spectrometer 300 can be increased.

The orbiting part 10 includes a plurality of pairs of electrodes. The electron spectrometer 300 includes the pair of electrodes to catch having the electrode to catch 1 and the electrode to catch 5, an pair of electrodes having an electrode 2 and an electrode 6, a pair of electrodes to release having a electrode to release 3 and a electrode to release 7, and an pair of electrodes having an electrode 4 and an electrode 8. The plurality of pairs of electrodes form an inner electrode 11 and an outer electrode 12. Specifically, the electrode to catch 1, the electrode 2, the electrode to release 3, and the electrode 4 form the inner electrode 11. The electrode to catch 5, the electrode 6, the electrode to release 7, and the electrode 8 form the outer electrode 12. An inner circumferential surface of the outer electrode 12 and an outer circumferential surface of the inner electrode 11 have a spherical shape. When the outer circumferential surface of the inner electrode 11 and the inner circumferential surface of the outer electrode 12 have a spherical shape, electrons having different azimuthal angles $\phi$ can be caused to orbit. A space between the inner circumferential surface of the outer electrode 12 and the outer circumferential surface of the inner electrode 11 serves as an orbiting path of the electrons. Positions of centers C of the sphere of the outer circumferential surface of the inner electrode 11 and the sphere of the inner circumferential surface of the outer electrode 12 are preferably the same.

A part of the plurality of pairs of electrodes of the orbiting part 10 is the pair of electrodes to catch. The electrode to catch 5 includes an electrode port to catch 16 for taking in electrons. The pair of electrodes to catch (the electrode to catch 1 and the electrode to catch 5) have a function of taking the electrons emitted from the sample into the orbiting part 10. The electrode to catch 1 and the electrode to catch 5 are ring-shaped. Due to the ring shape, electrons having different azimuthal angles $\phi$ can be caught into the orbiting part 10. For example, when a voltage applied to the pair of electrodes to catch is controlled by the control unit, the pair of electrodes to catch electrons into the orbiting part 10. Specifically, when the electrons that have passed through the electron velocity modulation part 30 reach the orbiting part 10, a high-speed pulsar or the like is used to instantaneously turn off the voltage applied to the pair of electrodes to catch, and the electrons are thereby caught into the orbiting part 10. A time required to instantaneously turn off (rise time and fall time: a time interval in which the instantaneous value of a pulse reaches 90% of the peak value from 10%) is, for example, 4 ns or less.

When the applied voltage is controlled, the plurality of pairs of electrodes of the orbiting part 10 cause electrons to orbit. The control of the voltage is performed by, for example, the control unit. In the present embodiment, the electrons are caused to orbit by applying a positive voltage to the electrode to catch 1, the electrode 2, the electrode to release 3, and the electrode 4, and applying a negative voltage to the electrode to catch 5, the electrode 6, the electrode to release 7, and the electrode 8. Electrons having a specific energy can be caused to orbit by changing the applied voltage. That is, an energy range of measured electrons can be adjusted according to the applied voltage.

A part of the plurality of pairs of electrodes of the orbiting part 10 is a pair of electrodes to release. The electrode to release 7 has an electrode port to release 17 for taking out electrons. The pair of electrodes to release (electrode to release 3 and electrode to release 7) have a function of taking out the electrons that have orbited a specific number of times from the orbiting part 10. The electrode to release 3 and the electrode to release 7 are ring-shaped. Due to the ring shape, electrons having different azimuthal angles ϕ can be released from the orbiting part 10. For example, when a voltage applied to the pair of electrode to release is controlled by the control unit, the electrons can be released from the orbiting part 10. Specifically, the electrons that have orbited a specific number of times are released from the orbiting part 10 when the voltage applied to the pair of electrodes to release is instantaneously turned off using a high-speed pulsar or the like. A time required to instantaneously turn off (rise time and fall time: a time interval in which an instantaneous value of a pulse reaches 90% of the peak value from 10%) is, for example, 4 ns or less. The released electrons enter the second trajectory correction part 50.

A distance R connecting the trajectory of orbiting electrons and the center C is not particularly limited, but a resolution of the electron spectrometer 300 can be increased as the distance R becomes larger.

(Second Trajectory Correction Part)

In the first embodiment, the bunch compression part 20 includes the first trajectory correction part 40 for changing the trajectory of electrons and the second trajectory correction part 50 for changing the trajectory of electrons. Since the ionization region has a predetermined size, initial positions or the like of the emitted electrons are different, and a plane (isochronous plane) connecting electrons having the same initial energy at the time of emission is not parallel to the surface of the detection part 120 when it reaches the detection part 120. When the first trajectory correction part 40 and the second trajectory correction part 50 invert the isochronous plane of the emitted electron bunch, the isochronous plane can be made parallel to the surface of the detection part 120 when the electrons reach the detection part 120. Thereby, a time spread of the electron bunch can be reduced.

The second trajectory correction part 50 is, for example, an electrostatic lens. The second trajectory correction part 50 is disposed on the pair of electrodes to release side. In the first embodiment, the second trajectory correction part 50 is an electrostatic lens including electrodes 51, 52, 53, 54, 55, and 56. In the first embodiment, the electrodes 51, 52, 53, 54, 55, and 56 are ring-shaped electrodes. The electrode 51 is disposed inside the electrode 52. The electrode 51 and the electrode 52 form an external electrode of the second trajectory correction part 50. The electrode 53 is disposed inside the electrode 54. The electrodes 53 and 54 form a center electrode of the second trajectory correction part 50. The electrode 55 is disposed inside the electrode 56. The electrodes 55 and 56 form an external electrode of the second trajectory correction part 50. In the present embodiment, the two external electrodes are, for example, the ground, and a steady voltage is applied to the center electrode. When a voltage applied to the center electrode of the first trajectory correction part 40 and the center electrode of the second trajectory correction part 50 is adjusted, the trajectory of electrons can be corrected, and the isochronous plane of the electrons can be made parallel to the surface of the detection part 120 when the electrons reach the detection part 120.

(Second Deflection Part)

The second deflection part 70 deflects a trajectory so that the electrons that have passed through the second trajectory correction part 50 enter the third deflection part 80. The second deflection part 70 includes, for example, electrodes 71 and 72. Shapes of the electrodes 71 and 72 are not particularly limited as long as the trajectory of electrons can be deflected so that the electrons enter the third deflection part 80.

(Third Deflection Part)

The third deflection part 80 deflects a trajectory so that the electrons that have passed through the second deflection part 70 enter the detection part 120. The third deflection part 80 includes, for example, electrodes 81 and 82. Shapes of the electrodes 81 and 82 are not particularly limited as long as the trajectory of electrons can be deflected so that the electrons enter the detection part 120.

(Detection Part)

The detection part 120 detects electrons released from the orbiting part 10 (electrons deflected by the third deflection part 80). As the detection part 120, for example, a one-dimensional detector may be used, or a two-dimensional detector may be used. A two-dimensional detector is particularly preferable. In the first embodiment, when electrons having different azimuthal angles ϕ are detected by a two-dimensional detector, a signal strength 500,000 times higher than that in single channel detection can be obtained, and information on a spatial angle distribution of electrons can also be obtained at the same time.

A path until the emitted electrons reach the detection part 120, that is, the inside of the electron spectrometer 300, is in a vacuum state. An internal pressure is preferably $1\times10^{-4}$ Pa or less. A lower internal pressure is more preferable. A known method can be used as a method for bringing the inside of the electron spectrometer 300 into a vacuum state, and for example, a diffusion pump, a turbo molecular pump, a titanium sublimation pump, or the like can be used to make the vacuum state.

A non-magnetic material is preferable as a material for each part serving as the electron path of the electron spectrometer 300. As the non-magnetic material, AISI 310 stainless steel or 2017 aluminum can be exemplified. A surface of the member serving as the electron path may be coated with colloidal graphite.

<Electron Spectroscopy>

Figure 3:
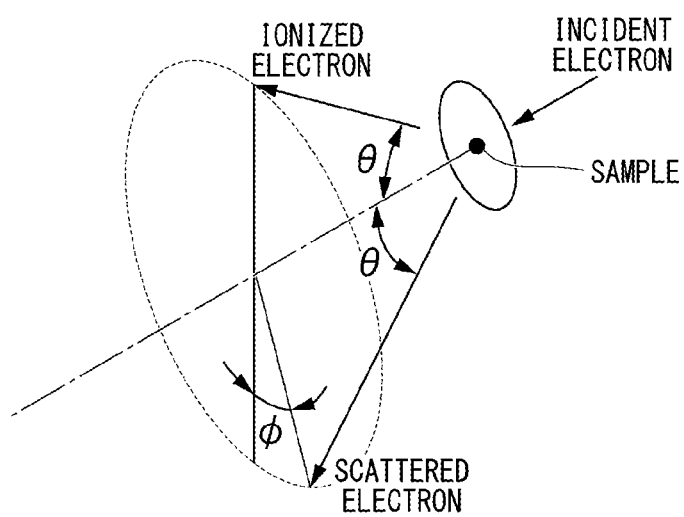
FIG. 3 is a view for explaining a relationship between incident electrons and electrons emitted from a sample.
Figure 5:
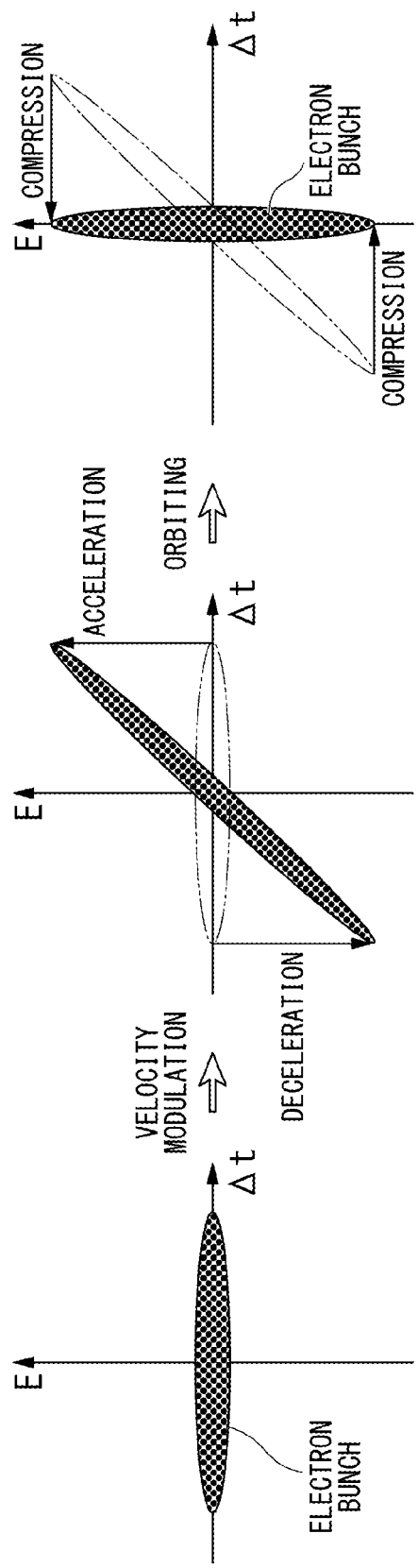
FIG. 5 is a view for explaining bunch compression by electron velocity modulation.

Electron spectroscopy using the electron spectrometer 300 will be described. As illustrated in FIG. 3, ionized electrons and scattered electrons having different azimuthal angles ϕ are emitted from a sample irradiated with an energy beam (here, incident electrons) (excitation step). Further, the example of FIG. 3 is an example of two electrons having the same scattering angle φ. The emitted electrons pass through the port to catch 90 as an electron bunch, are deflected by the first deflection part 60, and enter the first trajectory correction part 40. Next, the trajectory of the electrons is changed by the first trajectory correction part 40 (first trajectory correction step). After the first trajectory correction step, an electron in a front portion of the electron bunch is accelerated and an electron in a rear portion of the electron bunch is decelerated by the electron velocity modulation part 30 as illustrated in FIG. 5 (velocity modulation step). The velocity-modulated electrons are caught into the orbiting part 10 (catching step) and perform a certain number of orbiting motions (orbiting step). After the orbiting, the electrons are released (releasing step). The trajectory of the released electrons is corrected by the second trajectory correction part 50 (second trajectory correction step). Thereafter, the electrons are deflected by the second deflection part 70 and the third deflection part 80 and are detected by the detection part 120 (detection step).

(Catching Step, Orbiting Step, and Releasing Step)

Figure 4:
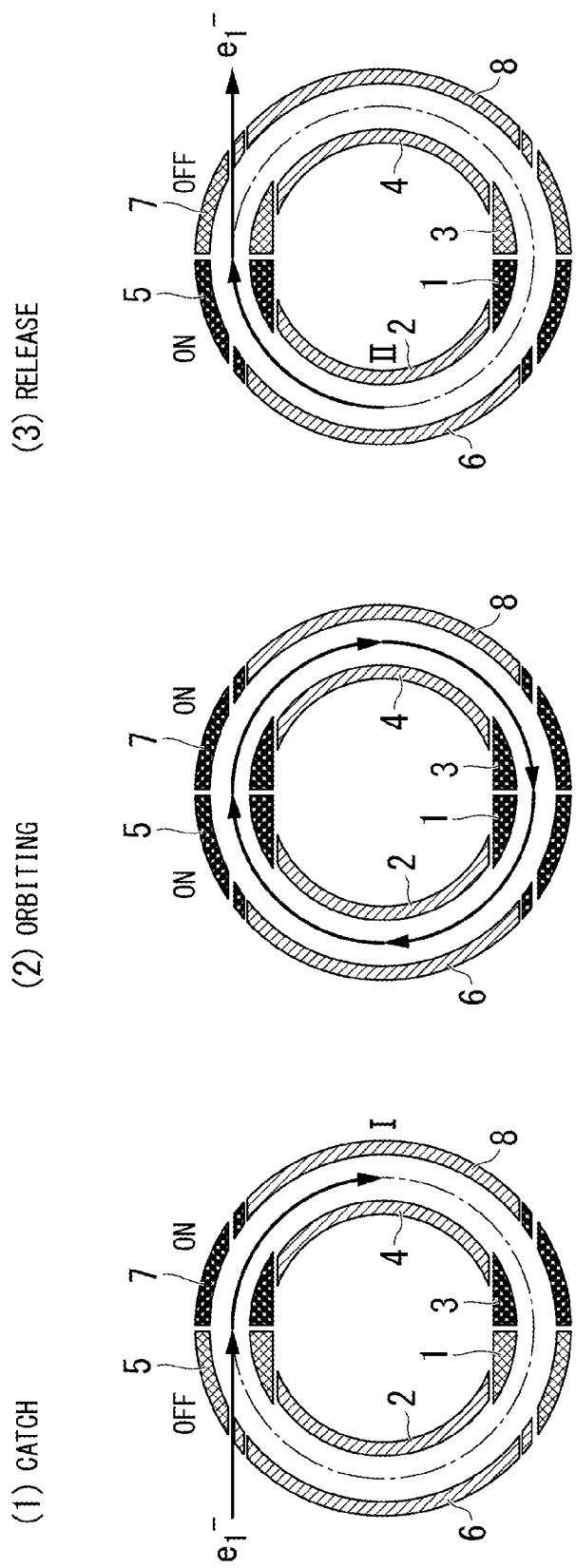
FIG. 4 is a view showing catching and releasing of electrons into and from an orbiting part.

The steps of taking the electrons into the orbiting part, orbiting the electrons, and taking out the electrons, and a relationship between the orbiting step and a resolution will be described. The catching and the releasing of electrons into and from the orbiting part 10 are performed by controlling voltages of the electrodes to catch 1 and 5 and the electrodes to release 3 and 7 with a pulse voltage. In the catching step, as illustrated in FIG. 4, electrons are caught in by turning off the electrodes to catch 1 and 5 with a pulse voltage. In the caught electrons, electrons having a specific energy are caused to orbit on the basis of a voltage applied to each pair of electrodes. Electrons subjected to orbiting can be adjusted according to the applied voltage. After the electrons orbit a specific number of times, the electrons are released when the electrodes to release 3 and 7 are turned off with a pulse voltage as illustrated in FIG. 4. Rise and fall times required to turn off the pulse voltage are not particularly limited, but are preferably, for example, 4 ns or less. A period T (Epass) in an orbiting motion of an electron having an energy Epass is shown in the following expression (1), and a period T (Epass+δE) in an orbiting motion of an electron whose energy is increased by δE to the energy Epass is shown in the following expression (2). Here, π is pi, $R_0$ is a radius of an orbit trajectory of the electron, m is a mass of the electron, Epass is a reference energy, and δE is an increment of energy. From the following expressions (1) and (2), it can be ascertained that a period is different according to energy possessed by the electron. When there is a difference in δE in the following expression (3), it shows a difference in period after N orbits. As shown in the following expression (3), the difference in period becomes N times after N orbits. That is, the resolution can be improved by N times after N orbits.

[Math. 1]

$$T(E_{pass}) = 2\pi R_o / \sqrt{2E_{pass}/m} \quad (1)$$

[Math. 2]

$$T(E_{pass} + \delta E) = \pi R_o \sqrt{\frac{2m(E_{pass})^2}{(E_{pass} - \delta E)^3}} \quad (2)$$

[Math. 3]

$$\Delta T_{MT-TOF}(\delta E) \approx 3\pi R_o \sqrt{\frac{m}{2(E_{pass})^3}} \delta E \times N \quad (3)$$

(Electron Bunch Compression by Electron Velocity Modulation)

In an electron velocity modulation step, a front portion of the electron bunch is accelerated and a rear portion is decelerated as illustrated in FIG. 5. As shown by the above-described expression (2), an electron having a higher velocity (higher energy) has a longer period. Therefore, when the electron bunch is caused to orbit by accelerating the front portion of the electron bunch and decelerating electrons in the rear portion of the electron bunch, a spread of the electron bunch can be reduced as illustrated in FIG. 5.

(Electron Bunch Compression by Trajectory Correction)

Figure 6:
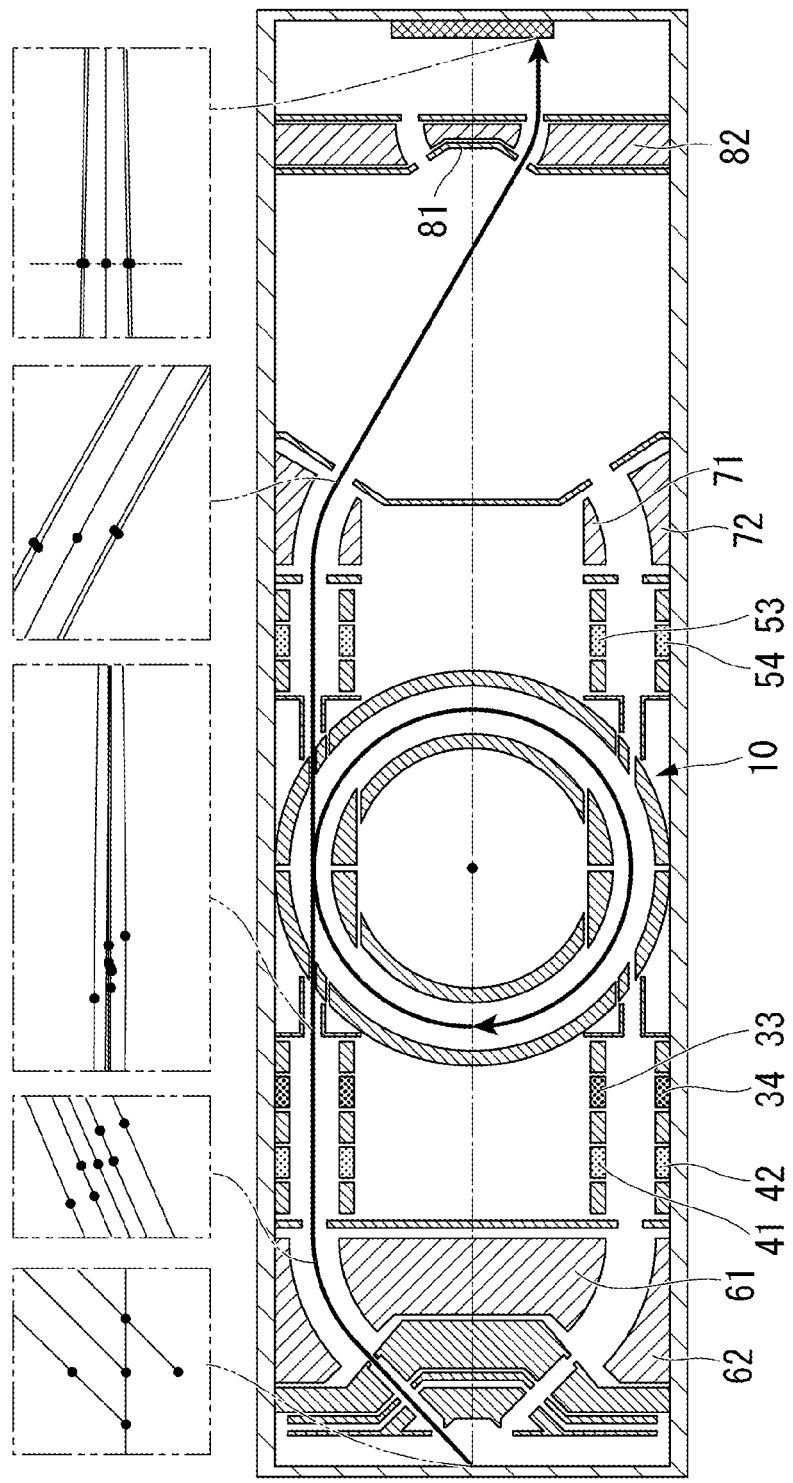
FIG. 6 is a view for explaining bunch compression by trajectory correction.

FIG. 6 illustrates positions of electrons at each part of the electron spectrometer 300 for the electrons emitted at the same time. Black circles in the upper figure of FIG. 6 indicate positions of electrons. As illustrated in FIG. 6, in the first trajectory correction step and the second trajectory correction step, when a predetermined voltage is applied to the center electrode of the first trajectory correction part 40 and the center electrode of the second trajectory correction part 50, the trajectory of electrons is changed to invert the isochronous plane of the electrons so that the isochronous plane of the electrons becomes parallel to the surface of the detection part 120 when the isochronous plane reaches the detection part 120. The voltage applied to the center electrode of the first trajectory correction part 40 and the center electrode of the second trajectory correction part 50 can be determined, for example, by performing a simulation.

The first embodiment has been described above. In the first embodiment, the sample delivery part has been used, but the sample may be placed in a sample holder and the sample may be irradiated with an energy beam. The electron spectrometer 300 may not include the bunch compression part 20.

Second Embodiment

Figure 7:
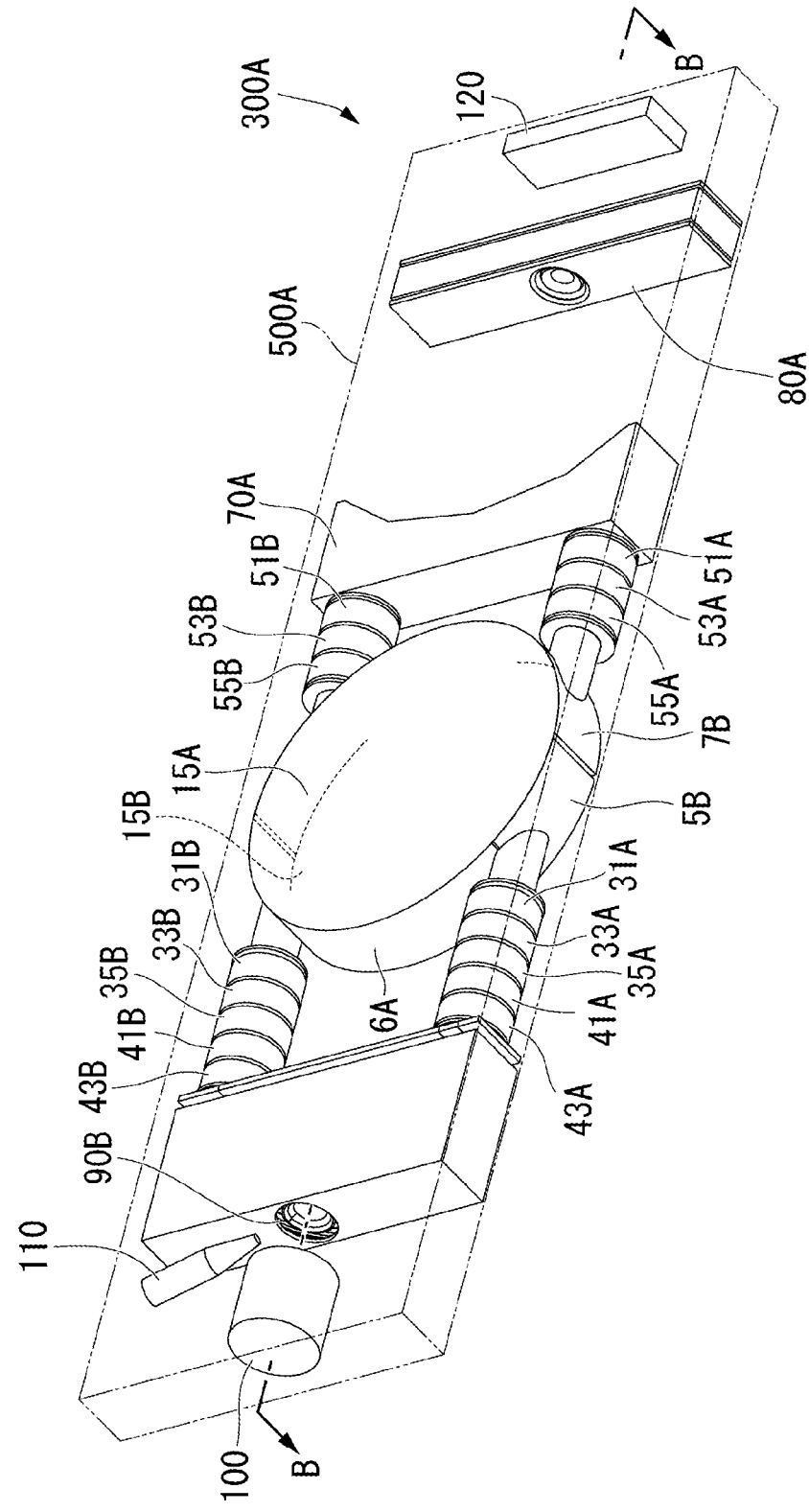
FIG. 7 is a schematic perspective view of an electron spectrometer according to another embodiment of the present invention.
Figure 8:
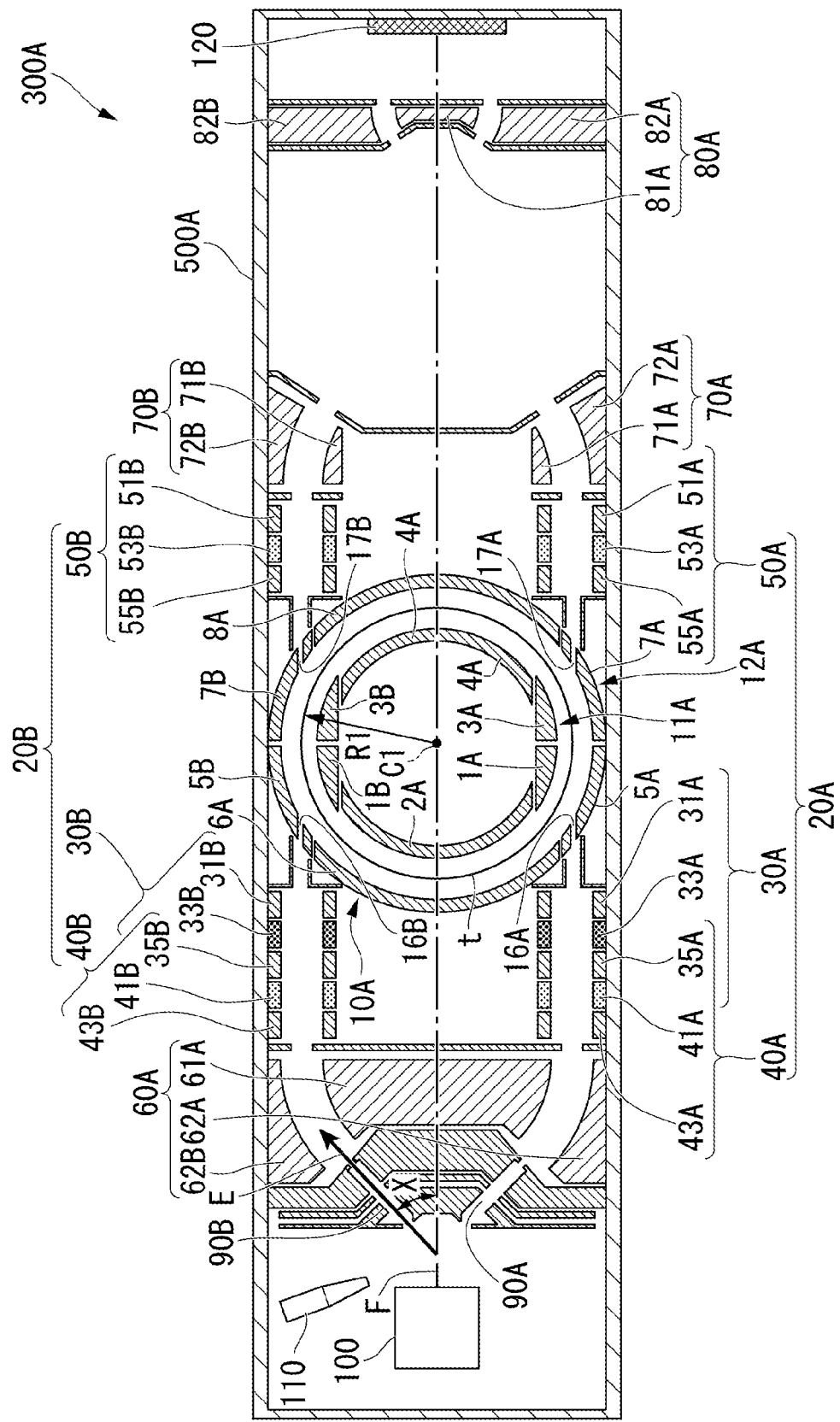
FIG. 8 is a cross-sectional view along line B-B of the electron spectrometer illustrated in FIG. 7.

FIG. 7 is a schematic perspective view of an electron spectrometer 300A according to a second embodiment. FIG. 8 is a cross-sectional view along line B-B of the electron spectrometer 300A illustrated in FIG. 7. The electron spectrometer 300A includes an orbiting part 10A, a bunch compression part 20A, a first deflection part 60A, second deflection parts 70A and 70B, a third deflection part 80A, ports to catch 90A and 90B, an excitation part 100, a sample delivery part 110, a detection part 120, and a control unit (not illustrated). The bunch compression part 20A includes electron velocity modulation parts 30A and 30B, first trajectory correction parts 40A and 40B, and second trajectory correction parts 50A and 50B. The parts described above are connected so that a vacuum state through an electron path can be maintained. Hereinafter, each of the parts will be described. In the second embodiment, the orbiting part 10A, the bunch compression part 20A, the first deflection part 60A, the second deflection parts 70A and 70B, the third deflection part 80A, the ports to catch 90A and 90B, the excitation part 100, the sample delivery part 110, and the detection part 120 are housed inside a container 500A.

(Port to Catch)

Electrons emitted from a sample irradiated with an energy beam pass through the ports to catch 90A and 90B and enter the first deflection part 60A. An angle X (a scattering angle when the energy beam is an electron beam) formed by a traveling direction F of the energy beam (here, electron beam) and a direction connecting a center of a region E in which the sample is irradiated with the energy beam to the port 90A to catch is not particularly limited, but may be, for example, 45 degrees. In a case of the port to catch 90B as well, an angle is not particularly limited as in the port to catch 90A, and may be, for example, 45 degrees. In the case of 45 degrees, electrons with a scattering angle of 45 degrees enter the orbiting part 10A. The ports to catch 90A and 90B are holes each formed in a direction that forms the angle X with respect to the traveling direction F.

(First Deflection Part)

The first deflection part 60A deflects a trajectory of electrons that have passed through the port to catch 90A to enter the first trajectory correction parts 40A and 40B. The first deflection part 60A is constituted by, for example, electrodes 61A, 62A, and 62B. An electric field is applied, for example, between the electrodes 61A and 62A and between the electrodes 61A and 62B. Shapes of the electrodes 61A, 62A, and 62B are not particularly limited as long as the trajectory of electrons can be deflected so that the electrons enter the first trajectory correction part 40.

(First Trajectory Correction Part)

The first trajectory correction parts 40A and 40B change the trajectory of electrons so that a time to reach the detection part 120 converges for each electron energy. The first trajectory correction parts 40A and 40B are disposed on a pair of electrodes to catch side. Also, when the first trajectory correction part 40A and the second trajectory correction part 50A invert an isochronous plane of an emitted electron bunch, the isochronous plane can be made parallel to a surface of the detection part 120 when the electrons reach the detection part 120. Similarly, when the first trajectory correction part 40B and the second trajectory correction part 50B invert an isochronous plane of an emitted electron bunch, the isochronous plane can be made parallel to the surface of the detection part 120 when the electrons reach the detection part 120. As a result, a time spread of the electron bunch can be reduced.

The first trajectory correction part 40A is, for example, an electrostatic lens. In the second embodiment, the first trajectory correction part 40A is constituted by electrodes 35A, 41A, and 43A. Similarly, the first trajectory correction part 40B is constituted by electrodes 35B, 41B, and 43B. In the second embodiment, the electrodes 35A, 35B, 41A, 41B, 43A, and 43B are ring-shaped electrodes. The electrode 35A and the electrode 43A form external electrodes of the first trajectory correction part 40A. The electrode 41A forms a center electrode of the first trajectory correction part 40A. The electrodes 35A, 41A, and 43A form one electrostatic lens. Similarly, the electrodes 35B, 41B, and 43B form one electrostatic lens. In the second embodiment, the two external electrodes (the electrodes 35A and 43A) of the first trajectory correction part 40A are, for example, the ground. A steady voltage is applied to the one center electrode (41A) of the first trajectory correction part 40A. The first trajectory correction part 40A converges the electrons that have entered the first trajectory correction part 40A through the first deflection part 60A. The first trajectory correction part 40B converges the electrons that have entered the first trajectory correction part 40B through the first deflection part 60A.

(Electron Velocity Modulation Part)

The electron velocity modulation parts 30A and 30B have a function of changing a velocity of electrons emitted from the sample. In the second embodiment, the electron velocity modulation part 30A is disposed adjacent to a pair of electrodes to catch (electrodes to catch 1A and 5A) side of the orbiting part 10A. The electron velocity modulation part 30B is disposed adjacent to a pair of electrodes to catch (electrodes to catch 1B and 5B) side of the orbiting part 10A. The electron velocity modulation part 30A sends electrons to the electrodes to catch 1A and 5A side after changing the velocity of the electrons. The electron velocity modulation part 30B sends electrons to the electrodes to catch 1B and 5B side after changing the velocity of the electrons. The electron velocity modulation part 30A and the electron velocity modulation part 30B accelerate a front portion of the electron bunch (a side that reaches the orbiting part 10A sooner) and decelerate a rear portion of the electron bunch (a side that reaches the orbiting part 10A later). As the velocity of the electrons becomes faster, the time required for orbiting around becomes longer. Therefore, when the electron bunch is caused to orbit in the orbiting part 10A after the front portion of the electron bunch is accelerated and the rear portion thereof is decelerated, a time spread of the electron bunch can be reduced.

The electron velocity modulation parts 30A and 30B are, for example, electrostatic lenses. In the second embodiment, the electron velocity modulation part 30A is an electrostatic lens including electrodes 31A, 33A, and 35A. The electron velocity modulation part 30B is an electrostatic lens including electrodes 31B, 33B, and 35B. In the second embodiment, 31A, 31B, 33A, 33B, 35A, and 35B are ring-shaped electrodes. The electrode 31A and the electrode 35A form external electrodes of the electron velocity modulation part 30A. The electrode 33A forms a center electrode of the electron velocity modulation part 30A. In the second embodiment, the two external electrodes (the electrodes 31A and 35A) of the electron velocity modulation part 30A are, for example, the ground. When a voltage in a sine-wave form is applied to the one center electrode (electrode) 33A, the electron bunch can be compressed after orbiting. Similarly to the electron velocity modulation part 30A, also in the electron velocity modulation part 30B, when a voltage in a sine-wave form is applied to the center electrode 33B, the electron bunch can be compressed after orbiting. Further, the electron velocity modulation part 30A and the first trajectory correction part 40A share the electrode 35A. Similarly, the electron velocity modulation part 30B and the first trajectory correction part 40B share the electrode 35B.

(Orbiting Part)

The orbiting part 10A has a function of causing electrons to orbit. Electrons to be subjected to orbiting are the electrons emitted from the sample irradiated with the energy beam. When an electric field is applied to cause the electrons to orbit in the orbiting part 10A, a flight distance of the electrons can be made large. As a result, a resolution of the electron spectrometer 300A can be improved. When the number of times the electrons orbit is increased, a resolution of the electron spectrometer 300A can be increased.

The orbiting part 10A includes a plurality of pairs of electrodes. The electron spectrometer 300A includes, the pair of pair to catch having the electrode to catch 1A and the electrode to catch 5A, the a pair of electrodes to catch having the electrode to catch 1B and the electrode to catch 5B, a pair of electrodes having an electrode 2A and an electrode 6A, a pair of electrodes to release having a electrode to release 3A and a electrode to release 7A, a pair of electrodes to release having a electrode to release 3B and a electrode to release 7B, and a pair of electrodes having electrodes 4A and 8A. The plurality of pairs of electrodes form an inner electrode 11A and an outer electrode 12A. Specifically, the electrode to catch 1A, the electrode to catch 1B, the electrode 2A, the electrode to release 3A, the electrode to release 3B, and the electrode 4A form the inner electrode 11A. The electrode to catch 5A, the electrode to catch 5B, the electrode 6A, the electrode to release 7A, the electrode to release 7B, and the electrode 8A form the outer electrode 12A. An inner circumferential surface of the outer electrode 12A and an outer circumferential surface of the inner electrode 11A are cylindrical. Since the outer circumferential surface of the inner electrode 11A and the inner circumferential surface of the outer electrode 12A are cylindrical, electrons can be caused to orbit. A space between the inner circumferential surface of the outer electrode 12A and the outer circumferential surface of the inner electrode 11A serves as an orbiting path of the electrons. A cylinder of the outer circumferential surface of the inner electrode 11A and a cylinder of the inner circumferential surface of the outer electrode 12 preferably have the same central axis C1. Further, the inner electrode 11A and the outer electrode 12A are connected to bottom surface members 15A and 15B so that an electric field of the orbiting path is not affected by others.

A part of the plurality of pairs of electrodes of the orbiting part 10A is a pair of electrodes to catch. In a case of the second embodiment, there are two pairs of electrodes to catch. The pair of electrodes to catch including the electrode to catch 1A and the electrode to catch 5A and the pair of electrodes to catch including the electrode to catch 1B and the electrode to catch 5B have a function of taking the electrons emitted from the sample into the orbiting part 10A. The electrodes to catch 5A and 5B include electrode ports to catch 16A and 16B for taking in electrons. For example, when a voltage applied to each of the pair of electrodes to catch is controlled by the control unit, the pairs of electrodes to catch each catch electrons into the orbiting part 10A. Specifically, when the electrons that have passed through the electron velocity modulation part 30A reach the orbiting part 10A, a high-speed pulsar or the like is used to instantaneously turn off the voltage applied to each of the pair of electrodes to catch, and thereby the electrons are caught into the orbiting part 10A. A time required to instantaneously turn off (rise time and fall time: a time interval in which an instantaneous value of a pulse reaches 90% of the peak value from 10%) is, for example, 4 ns or less.

When the applied voltage is controlled, the plurality of pairs of electrodes of the orbiting part 10A cause electrons to orbit. The control of the voltage is performed by, for example, the control unit. In the present embodiment, the electrons are caused to orbit by applying a positive voltage to the electrode to catch 1A, the electrode to catch 1B, the electrode 2A, the electrode to release 3A, the electrode to release 3B, and the electrode 4A, and applying a negative voltage to the electrode to catch 5A, the electrode to catch 5B, and the electrode 6A, the electrode to release 7A, the electrode to release 7B, and the electrode 8A. Electrons having a specific energy can be caused to orbit by changing the applied voltage. That is, an energy range of measured electrons can be adjusted according to the applied voltage.

A part of the plurality of pairs of electrodes of the orbiting part 10A is a pair of electrodes to release. In the second embodiment, there are two pair of electrodes to release. The pair of electrodes to release including the electrode to release 3A and the electrode to release 7A and the pair of electrodes to release including the electrode to release 3B and the electrode to release 7B have a function of taking out the electrons that have orbited a specific number of times from the orbiting part 10A. The electrodes to release 7A and 7B include electrode ports to release 17A and 17B for taking out the electrons. For example, when a voltage applied to each of the pair of electrodes to release is controlled by the control unit, the electrons can be released from the orbiting part 10A. Specifically, the electrons that have orbited a specific number of times are released from the orbiting part 10A when the voltage applied to each of the pair of electrodes to release is instantaneously turned off using a high-speed pulsar or the like. A time required to instantaneously turn off (rise time and fall time: a time interval in which an instantaneous value of a pulse reaches 90% of the peak value from 10%) is, for example, 4 ns or less. The electrons released from the electrodes to release 3A and 7A side enter the second trajectory correction part 50A. The electrons released from the electrodes to release 3B and 7B side enter the second trajectory correction part 50B.

A distance R1 connecting the trajectory of orbiting electrons and the central axis C1 is not particularly limited, but a resolution of the electron spectrometer 300A can be increased as the distance R1 becomes larger.

(Second Trajectory Correction Part)

In the second embodiment, the bunch compression part 20A includes the first trajectory correction parts 40A and 40B for changing the trajectory of electrons and the second trajectory correction parts 50A and 50B for changing the trajectory of electrons. Since an ionization region has a predetermined size, initial positions or the like of the emitted electrons are different, and a plane (isochronous plane) connecting electrons having the same initial energy at the time of emission is not parallel to the surface of the detection part 120 when it reaches the detection part 120. When the first trajectory correction part 40A and the second trajectory correction part 50A invert the isochronous plane of the emitted electron bunch, the isochronous plane of the electrons can be made parallel to the surface of the detection part 120 when the electrons reach the detection part 120. Similarly, in the first trajectory correction part 40B and the second trajectory correction part 50B, the isochronous plane of the electrons can be made parallel to the surface of the detection part 120. Thereby, a time spread of the electron bunch can be reduced.

The second trajectory correction parts 50A and 50B are, for example, electrostatic lenses. The second trajectory correction parts 50A and 50B are disposed on the pair of electrodes to release side. In the second embodiment, the second trajectory correction part 50A is an electrostatic lens including electrodes 51A, 53A, and 55A. The second trajectory correction part 50B is an electrostatic lens including electrodes 51B, 53B, and 55B. In the second embodiment, the electrodes 51A, 51B, 53A, 53B, 55A, and 55B are ring-shaped electrodes. The electrode 51A and the electrode 55A form an external electrode of the second trajectory correction part 50A. The electrode 53A forms a center electrode of the second trajectory correction part 50A. In the second embodiment, the two external electrodes (the electrodes 51A and 55A) of the second trajectory correction part 50A are, for example, the ground. A steady voltage is applied to the center electrode (53A) of the second trajectory correction part 50A. When a voltage applied to the center electrode of each of the first trajectory correction part 40A and the center electrode of the second trajectory correction part 50A is adjusted, the trajectory of electrons can be corrected, and the isochronous plane of the electrons can be made parallel to the surface of the detection part 120 when the electrons reach the detection part 120. The second trajectory correction part 50B is also similar to the second trajectory correction part 50A. The electrons corrected by the second trajectory correction part 50A enter the second deflection part 70A. The electrons corrected by the second trajectory correction part 50B enter the second deflection part 70B.

(Second Deflection Part)

The second deflection part 70A deflects a trajectory so that the electrons that have passed through the second trajectory correction part 50A enter the third deflection part 80A. The second deflection part 70A includes, for example, electrodes 71A and 72A. Similarly, the second deflection part 70B deflects a trajectory so that the electrons that have passed through the second trajectory correction part 50B enter the third deflection part 80A. The second deflection part 70B includes, for example, electrodes 71B and 72B. A voltage is applied, for example, between the electrodes 71A and 72A and between the electrodes 71B and 72B. Shapes of the electrodes 71A, 71B, 72A, and 72B are not particularly limited as long as the trajectory of electrons can be deflected so that the electrons enter the third deflection part 80A.

(Third Deflection Part)

The third deflection part 80A deflects a trajectory so that the electrons that have passed through the second deflection parts 70A and 70B enter the detection part 120. The third deflection part 80A includes, for example, electrodes 81A, 82A and 82B. A voltage is applied, for example, between the electrodes 81A and 82A and between the electrodes 81A and 82B. Shapes of the electrodes 81A, 82A and 82B are not particularly limited as long as the trajectory of electrons can be deflected so that the electrons enter the detection part 120.

A path until the emitted electrons reach the detection part 120, that is, the inside of the electron spectrometer 300A is in a vacuum state. An internal pressure is preferably $1\times10^{-4}$ Pa or less. A lower internal pressure is more preferable. A known method can be used as a method for bringing the inside of the electron spectrometer 300A into a vacuum state, and for example, a diffusion pump, a turbo molecular pump, a titanium sublimation pump, or the like can be used to make the vacuum state.

A non-magnetic material is preferable as a material for each part serving as the electron path of the v 300A. As the non-magnetic material, AISI 310 stainless steel and 2017 aluminum can be exemplified. A surface of a member serving as the electron path may be coated with colloidal graphite.

<Electron Spectroscopy>

The electron spectroscopy using the electron spectrometer 300A according to the second embodiment is the same as that of the first embodiment except that measurable electrons are limited to electrons with a certain range of an azimuthal angle $\phi$.

The second embodiment has been described above. In the second embodiment, the bunch compression part 20A includes the two electron velocity modulation parts 30, the two first trajectory correction parts 40, and the two second trajectory correction parts 50, but each one of them may be used.

The technical scope of the present invention is not limited to the above-described embodiments, and various modifications can be made in a range not departing from the meaning of the present invention.

[Example]

Next, an example of the present invention will be described, but the condition in the example is one condition example employed for ascertaining feasibility and effects of the present invention, and the present invention is not limited to the one condition example. The present invention can employ various conditions as long as the objective of the present invention is achieved without departing from the gist of the present invention.

(Effects of Bunch Compression and Number of Times of Electron Orbiting)

Figure 2:
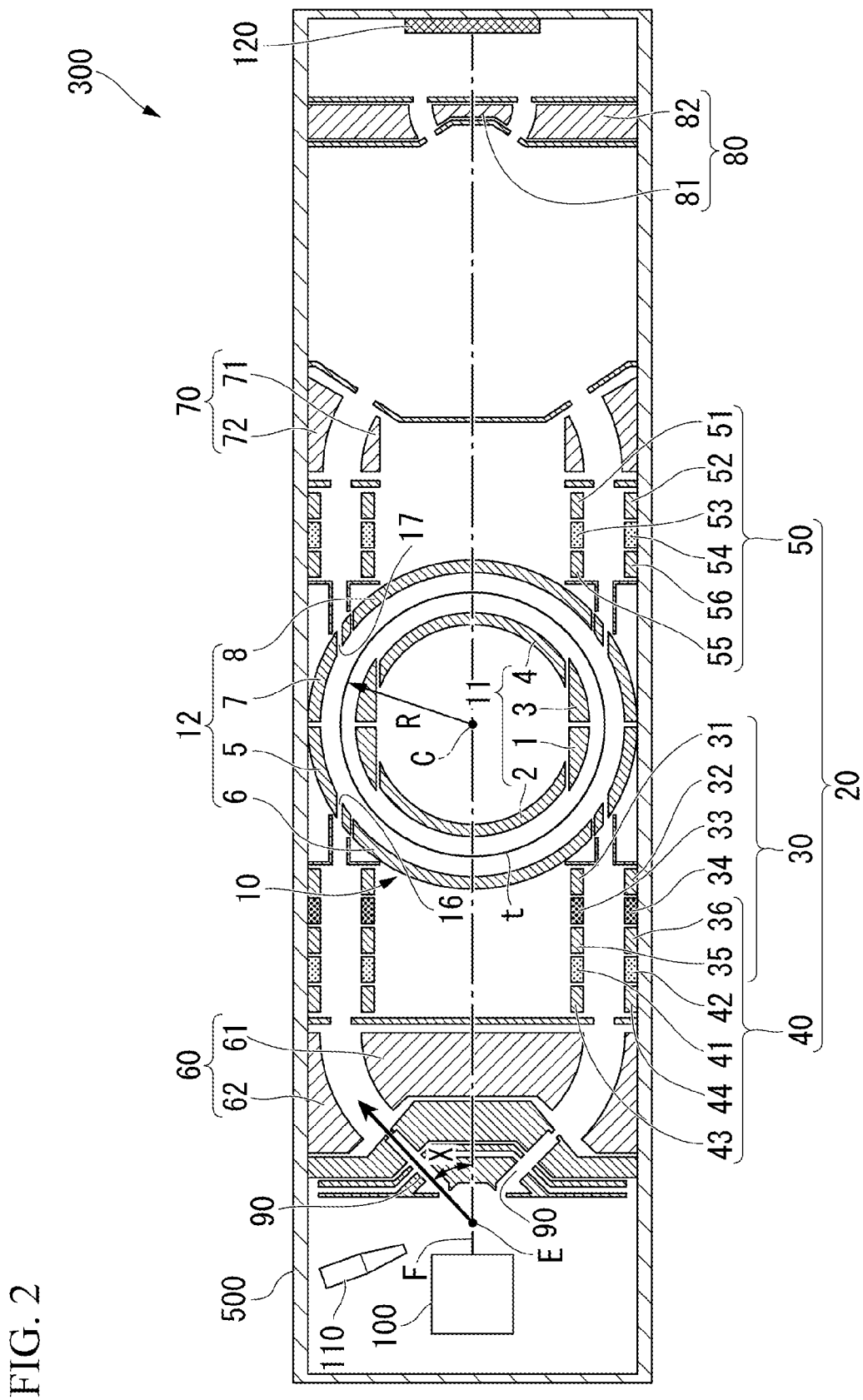
FIG. 2 is a cross-sectional view along line A-A of the electron spectrometer illustrated in FIG. 1.
Figure 9:
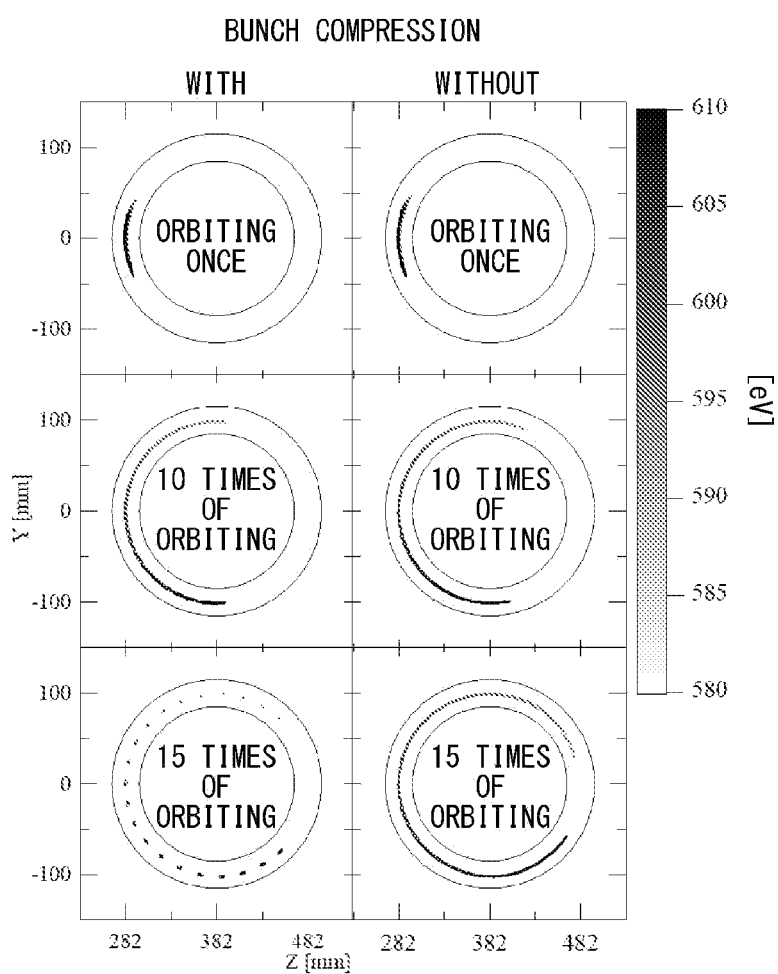
FIG. 9 is a diagram for explaining an effect of bunch compression and orbiting on resolution.

FIG. 9 shows results of simulating a relationship between electron bunch compression, the number of times the electrons orbit, and a distribution of electrons on the basis of the electron spectrometers having configurations of FIGS. 1 and 2. This shows a state of motion in the orbiting part after an electron bunch of 595 eV to 605 eV (in increments of 1 eV), which can be occurred under a condition that a pulse width of an electron beam serving as an energy beam is 5 ns, is caught into the orbiting part with a pulse voltage of 4 ns in rising time and falling time. The figure on the left shows a case in which bunch compression has been performed, and the figure on the right shows a case in which bunch compression has not been performed. As shown in FIG. 9, it was ascertained that electrons of each energy can be separated for each energy by the electron bunch compression. It was also ascertained that electrons of different energy can be better separated as the number of time of orbiting motion increases.

(Comparison with Conventional Electron Spectrometer)

Figure 10:
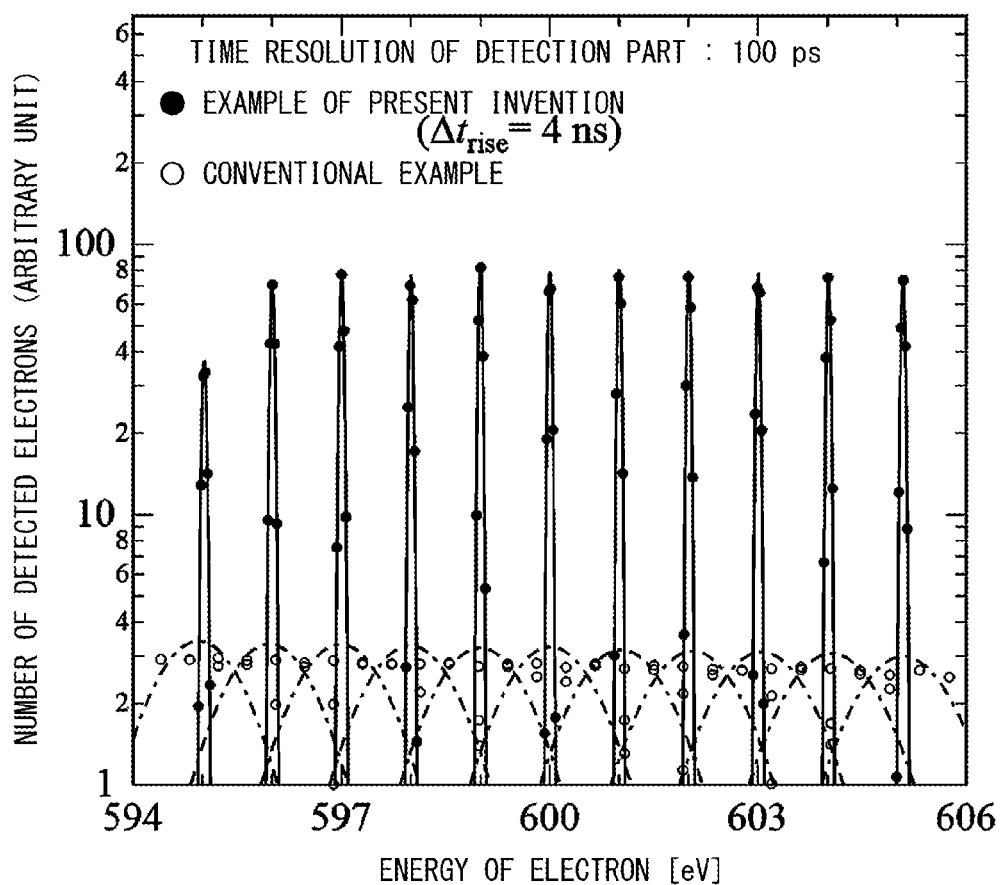
FIG. 10 is a diagram comparing performance of a conventional electron spectrometer and the electron spectrometer according to the present embodiment.

FIG. 10 shows examples of simulation results of electron energy and the number of detected electrons in a conventional electron spectrometer (an electron spectrometer without an orbiting part and a bunch compression part) and the electron spectrometer according to the present embodiment (the electron spectrometer of the first embodiment illustrated in FIGS. 1 and 2). This was performed under conditions in which a time resolution of the detection part was 100 ps, a pulse width of the electron beam was 5 ns, and the number of times the electrons orbit in the orbiting part 10 was 15. In FIG. 10, the horizontal axis represents an electron energy (eV) and the vertical axis represents the number of detected electrons. As shown in FIG. 10, the electron spectrometer according to the present embodiment was able to separate each energy. When resolutions at 600 eV were compared, a conventional resolution was 1.78 eV, but a resolution in the first embodiment was 0.0668 eV, and this shows 27 times higher than that of the conventional resolution.

As described above, the electron spectrometer of the present disclosure has a high resolution for high-velocity electrons and therefore can be used as an electron momentum spectroscope. Also, with the high resolution, a shape of a wave function can be observed in a momentum space. A state function, which was conventionally determined depending on minimization of energy by an integral value over the entire space, was not sufficient for description of a distant system that determines an interaction between molecules. Therefore, in a state function calculated by the conventional method, it was not possible to sufficiently search for a molecular recognition mechanism model or the like. When the electron spectrometer of the present disclosure is used, it is possible to obtain a more accurate state function. Therefore, the electron spectrometer of the present disclosure is useful for searching for a new molecular recognition mechanism model that requires a precise state function.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description and is only limited by the scope of the appended claims.

EXPLANATION OF REFERENCES 1, 5 Electrode to catch
3, 7 Electrode to release
2, 4, 6, 8 Electrode
10 Orbiting part
20 Bunch compression part
30 Electron velocity modulation part
40 First trajectory correction part
50 Second trajectory correction part
300 Electron spectrometer

What is claimed is:

1. An electron spectrometer comprising:
an excitation part irradiating a sample with an energy beam;
an orbiting part causing electrons emitted from the sample irradiated with the energy beam to orbit; and
a detection part detecting the electrons released from the orbiting part, wherein
the orbiting part includes a plurality of pairs of electrodes,
the plurality of pairs of electrodes cause the electrons to orbit when an applied voltage is controlled,
a part of the plurality of pairs of electrodes are pairs of electrodes to catch which catch the electrons into the orbiting part when an applied voltage is controlled, and
a part of the plurality of pairs of electrodes are pairs of electrodes to release which release the electrons from the orbiting part when an applied voltage is controlled; and
further comprising a bunch compression part which reduces a time spread of an electron bunch, which is a bunch of electrons, by changing at least one of a velocity and a trajectory of the electrons.

2. The electron spectrometer according to claim 1, wherein
the bunch compression part includes an electron velocity modulation part disposed adjacent to the pair of electrodes to catch, and
the electron velocity modulation part changes a velocity of the electrons and then sends the electrons to the pair of electrodes to catch side.

3. The electron spectrometer according to claim 2, wherein the electron velocity modulation part is an electrostatic lens.

4. The electron spectrometer according to claim 1, wherein
the bunch compression part includes:
a first trajectory correction part which changes a trajectory of the electrons disposed on the pair of electrodes to catch side; and
a second trajectory correction part which changes a trajectory of the electrons disposed on the pair of electrode to release side, and
the bunch compression part reduces a time spread of the electron bunch using the first trajectory correction part and the second trajectory correction part.

5. The electron spectrometer according to 2, wherein the bunch compression part includes:
a first trajectory correction part which changes a trajectory of the electrons disposed on the pair of electrodes to catch side; and
a second trajectory correction part which changes a trajectory of the electrons disposed on the pair of electrodes to release side, and
the bunch compression part reduces a time spread of the electron bunch using the first trajectory correction part and the second trajectory correction part.

6. The electron spectrometer according to 3, wherein the bunch compression part includes:
a first trajectory correction part which changes a trajectory of the electrons disposed on the pair of electrodes to catch side; and
a second trajectory correction part which changes a trajectory of the electrons disposed on the pair of electrodes to release side, and
the bunch compression part reduces a time spread of the electron bunch using the first trajectory correction part and the second trajectory correction part.

7. The electron spectrometer according to claim 4, wherein the first trajectory correction part and the second trajectory correction part are electrostatic lenses.

8. The electron spectrometer according to claim 5, wherein the first trajectory correction part and the second trajectory correction part are electrostatic lenses.

9. The electron spectrometer according to claim 6, wherein the first trajectory correction part and the second trajectory correction part are electrostatic lenses.

10. The electron spectrometer according to claim 1, wherein
the plurality of pairs of electrodes form an outer electrode and an inner electrode,
an inner circumferential surface of the outer electrode and an outer circumferential surface of the inner electrode have a spherical shape, and
a space between the inner circumferential surface of the outer electrode and the outer circumferential surface of the inner electrode serves as an orbiting path of the electrons.

11. The electron spectrometer according to claim 1, wherein
the plurality of pairs of electrodes form an outer electrode and an inner electrode,
an inner circumferential surface of the outer electrode and an outer circumferential surface of the inner electrode have a cylindrical shape, and
a space between the inner circumferential surface of the outer electrode and the outer circumferential surface of the inner electrode serves as an orbiting path of the electrons.

* * * * *